United States Patent

Siira

[11] Patent Number: 6,023,607
[45] Date of Patent: Feb. 8, 2000

[54] RADIO SYSTEM AND A CALL SETUP METHOD

[75] Inventor: Mikko Siira, Oulu, Finland

[73] Assignee: Nokia Telecommunication Oy, Espoo, Finland

[21] Appl. No.: 08/866,154

[22] Filed: May 30, 1997

[51] Int. Cl.[7] .................................................. H04Q 7/20
[52] U.S. Cl. ........................ 455/25; 455/562; 455/456; 342/457; 342/75
[58] Field of Search ............................. 455/25, 562, 456; 342/79, 74, 81, 82, 75, 76, 88, 89, 90, 118, 140, 154, 155, 374, 385, 376, 457; 343/731

[56] References Cited

U.S. PATENT DOCUMENTS

| | | | |
|---|---|---|---|
| 3,922,677 | 11/1975 | Tomkewitsch et al. | 342/457 |
| 5,508,707 | 4/1996 | LeBlanc et al. | 342/457 |
| 5,544,223 | 8/1996 | Robbins et al. | 455/426 |
| 5,590,399 | 12/1996 | Matsumoto | 455/449 |
| 5,675,554 | 10/1997 | Cole et al. | 367/138 |
| 5,714,957 | 2/1998 | Searle et al. | 342/374 |
| 5,754,138 | 5/1998 | Turcotte et al. | 342/373 |
| 5,764,188 | 6/1998 | Ghosh et al. | 342/457 |
| 5,771,017 | 6/1998 | Dean et al. | 342/374 |
| 5,844,522 | 12/1998 | Sheffer et al. | 342/457 |

FOREIGN PATENT DOCUMENTS

| | | |
|---|---|---|
| WO 96/13948 | 5/1996 | European Pat. Off. . |
| WO 98/19484 | 5/1998 | Germany . |
| WO 97/3644 | 10/1997 | Japan . |

*Primary Examiner*—Wellington Chin
*Assistant Examiner*—Isaak R. Jama
*Attorney, Agent, or Firm*—Cushman Darby & Cushman IP Group of Pillsbury Madison & Sutro

[57] ABSTRACT

The invention relates to a radio system where oriented antenna beams are used over a radio connection between a network subsystem and a subscriber terminal with a fixed location. The network subsystem comprises means for storing parameters of a bidirectional radio connection, including e.g. the transmit beam angle, the receive beam angle, the air interface delay profile, the air interface impulse response, the transmit power of the network subsystem, the transmit power of the subscriber terminal, and the number of rake branches. The network subsystem also comprises a common measuring unit that measures parameters of a bidirectional test radio connection of a new user.

17 Claims, 3 Drawing Sheets

RADIO SYSTEM AND A CALL SETUP METHOD

FIELD OF THE INVENTION

The invention relates to a radio system comprising a network subsystem and at least one subscriber terminal that has a fixed location and a bidirectional radio connection to the network subsystem, the radio connection utilizing oriented antenna beams.

BACKGROUND OF THE INVENTION

In recent years an arrangement has become known in which a data transmission connection between a switching centre and a subscriber terminal in the public switched telephone network (PSTN) is implemented wirelessly by means of a radio connection. The arrangement is known as a wireless local loop (WLL). This arrangement avoids the installation of cables in a customer's premises. Since apparatuses, for example base stations, belonging to a network subsystem used in cellular radio networks and subscriber terminals operating over a radio connection have become less expensive, the arrangement is competitive. However, the high cost of the network infrastructure may constitute a problem since in sparsely inhabited regions, for example, the number of normal base stations required is rather great in order that broad areas can be covered.

Different smart antenna arrangements have been developed in cellular radio networks to increase the range of the base station and the traffic capacity of the system. Such arrangements are called Space Division Multiple Access (SDMA). A typical arrangement is an antenna array. For example in a base station it is possible to measure in some manner the direction where a subscriber terminal is situated with respect to the base station and to use an antenna beam oriented towards the subscriber terminal in the transmission. In the reception, the desired multipath-propagated signal components can be combined constructively by means of a smart antenna arrangement and the effect of possible interfering signals can be minimized. With the above-described arrangement it is possible, for example, to improve the carrier/interference ratio of the signal, increase cell capacity, improve connection quality, increase the battery life of the subscriber terminal and to lengthen the range.

Combining the above-described WLL and SDMA technologies creates such great costs that the arrangement is not competitive compared to a normal fixed telephone connection implemented with a cable. This is due to the fact that the receiver requires multidimensional beam searchers and trackers for each traffic channel. Multidimensional impulse response measurement is also required. If the system also employs Code Division Multiple Access (CDMA) technology, multidimensional code acquisition is required at the reception.

BRIEF SUMMARY OF THE INVENTION

The purpose of the present invention is to provide a radio system where the above-described WLL and SDMA technologies can be combined with low costs.

This is achieved with a system where the network subsystem comprises means for storing the parameters of the bidirectional radio connection.

The greatest advantage of the process according to the invention is that it enables the implementation of a connection between a subscriber terminal and the public switched telephone network at competitive prices.

DESCRIPTION OF THE DRAWINGS

In the following, the invention will be described in greater detail with reference to the examples according to the accompanying drawings, in which.

DESCRIPTION OF THE PREFERRED EMBODIMENTS

The present invention is applicable for use in all such radio systems that can be made to operate more effectively by means of the SDMA technology. The present application uses TDMA and CDMA systems as examples, without restricting the invention thereto, however.

Figure 1:
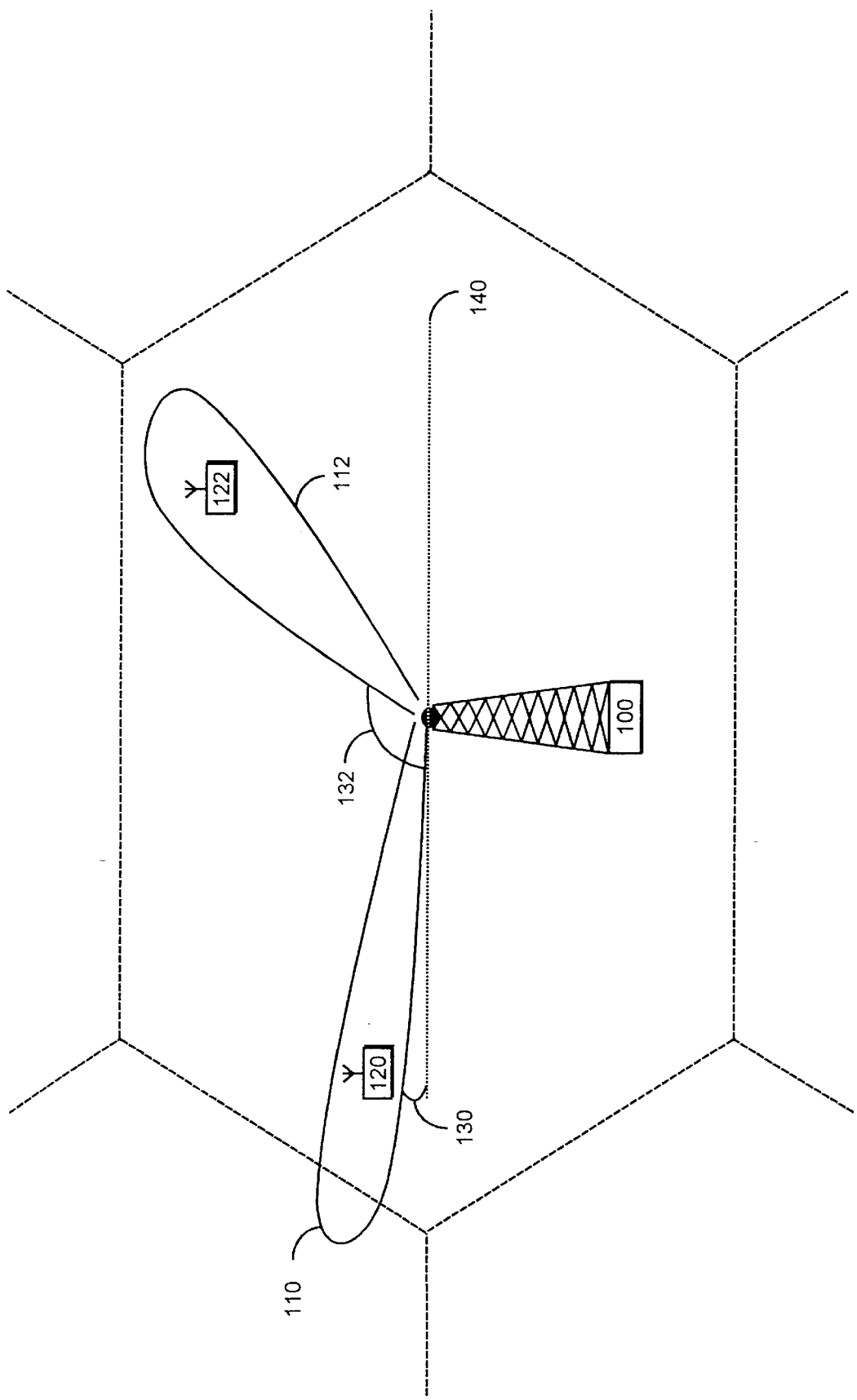
FIG. 1 shows the operating principle of SDMA.

FIG. 1 illustrates the operation according to the invention. A network subsystem 100 utilizes oriented antenna beams. In the present application, the network subsystem 100 refers to fixed apparatuses that are usually controlled by the network operator, for example base stations, base station controllers, network management systems, transmission devices and switching centres. The unity formed by a base station controller and the base stations it controls is called a base station system.

Users that own a subscriber terminal 120, 122 with a fixed location, such as a private house, may set up a connection with some other user via the network subsystem 100 if they so desire. Correspondingly, another user may make a call to the subscriber terminal 120, 122. An oriented antenna beam 110 of the subscriber terminal 120 of the first user does not interfere with an oriented antenna beam 112 of the subscriber terminal 122 of the second user. The idea is that antenna beam orientation is used instead of or in addition to a normal omnidirectional antenna or a cell sectorized into three parts, for example. The narrower the antenna beam, the greater the capacity of the cell. The direction of the oriented antenna beam can be indicated, for example, such that an east-west direction 140 is determined for the geographical location of the base station. The angle of the antenna beam is then indicated in degrees from this direction. For example, the angle 130 of the first antenna beam 110 is about 20 degrees in the figure. The angle 132 of the second antenna beam 112 is correspondingly about 110 degrees. The angles of the transmit and receive antenna beams may be of different magnitude if separate antennas are provided for transmission and reception, for example.

The subscriber terminal 120 may also utilize an oriented antenna beam in its own transmission. In the simplest form, a normal directional antenna is connected to the subscriber terminal 120 and oriented towards the reception antenna array of the base station of the network subsystem 100.

Figure 2:
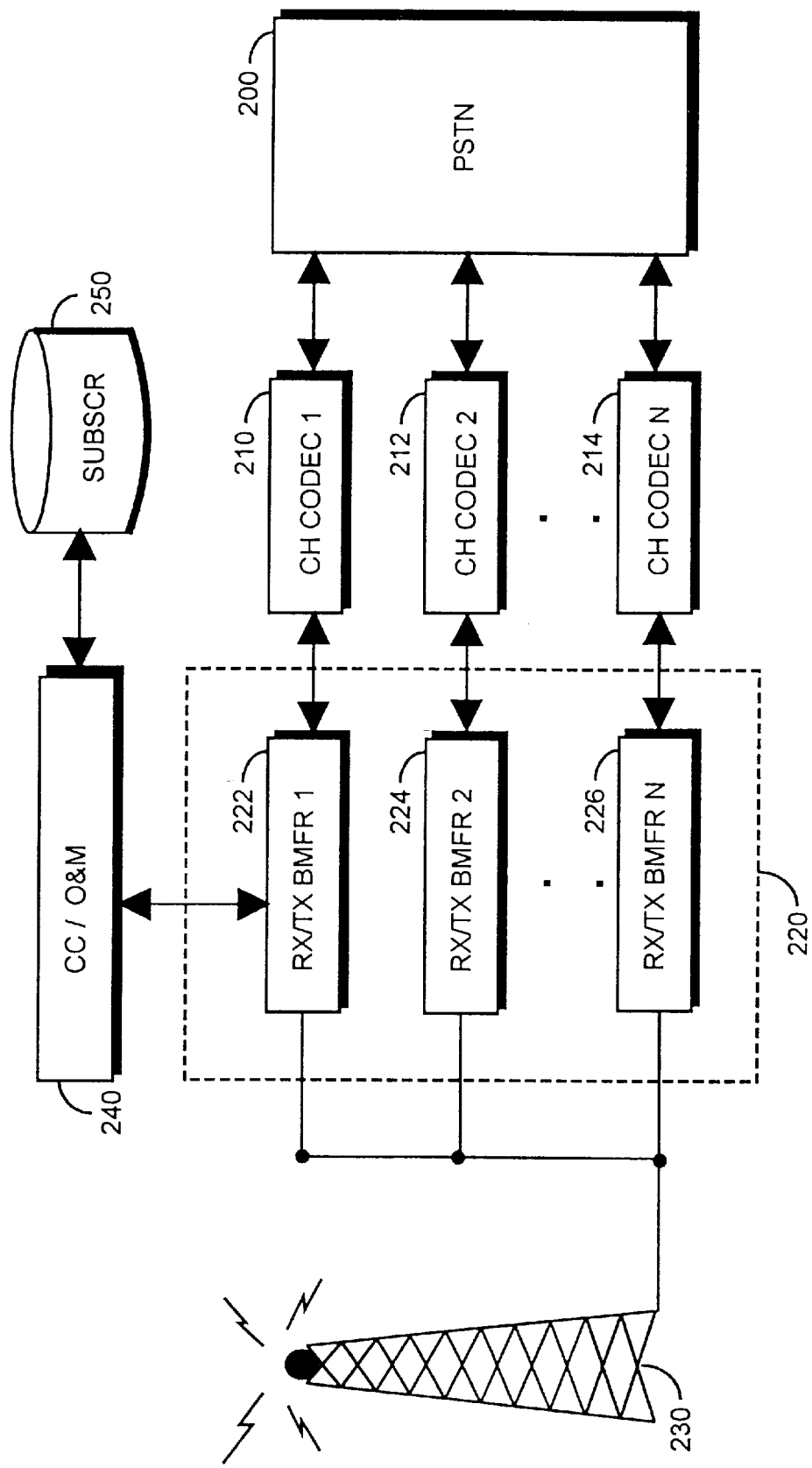
FIG. 2 is a block diagram illustrating a base station of a network subsystem according to the invention.

FIG. 2 is a simplified block diagram of a base station according to the invention. FIG. 2 only shows the blocks that are essential for illustrating the invention, but it is evident for a person skilled in the art that a conventional base station also comprises several other functions and structures that will not be described in greater detail herein. In practice, a base station may be for example a normal base station of a GSM system that utilizes SDMA technology and that has been modified in the manners required by the invention.

A base station is connected to the public switched telephone network 200 via channel codecs 210, 212, 214. The channel codecs carry out the processing of a baseband signal. An array 220 of transmit and receive beam formers is connected to the channel codecs 210, 212, 214. Each beam former 222, 224, 226 is connected to one channel codec 210, 212, 214. The function of the beam former 222, 224, 226 is to generate information about the direction by processing the oriented antenna beam both in transmission and in reception. Via an antenna array 230 the base station transmits and receives an oriented antenna beam. The beam former array 220 is controlled by a control unit 240 that is responsible for call control and operation and maintenance. The control unit 240 utilizes a subscriber database 250 where information about subscriber properties is stored.

According to the invention, the network subsystem 100 comprises means for storing parameters of a bidirectional radio connection. The parameters can be preferably stored in the subscriber database 250 of the base station system.

The network subsystem comprises at least one common measuring unit that is arranged to measure the parameters of the bidirectional test radio connection of the new user. In the base station shown in FIG. 2, this is carried out preferably such that one of the beam formers of the beam former array 220, for example beam former 222, has a more complicated structure than the other beam formers and comprises a beam searcher. The beam former 222 can therefore be called a common measuring unit.

When a new user arrives at the system, a bidirectional test radio connection is first set up between the network subsystem 100 and the subscriber terminal 120. The common measuring unit 222 then measures the parameters of the test radio connection. The parameters include, for example, the transmit beam angle, the receive beam angle, the air interface channel profile and impulse response, without restricting the invention thereto, however. The transmit and receive beam angles are shown above in FIG. 1. The air interface channel profile means that a fixed number that always remains the same can be measured for the timing between transmission and reception, since the subscriber terminal does not move. The parameters are stored in the subscriber database 250. According to the invention, it is also possible to store in the subscriber database the transmit power of the network subsystem 100 and/or the transmit power of the subscriber terminal 120. The network subsystem 100 is most preferably informed of the transmit power of the subscriber terminal 120 such that the subscriber terminal 120 signals it to the network subsystem 100 during the test radio connection. The network subsystem 100 naturally knows its own transmit power, wherefore it does not have to be measured.

When the invention is used in a CDMA system, the receiver is a rake receiver. In the CDMA, users are distinguished from one another by means of a spreading code that is characteristic of each connection. The information to be transmitted is multiplied in the transmission with a spreading code that has a considerably broader band and that is typically pseudo-random. In the reception, the broadband signal is multiplied with the same spreading code so that it is restored to the narrow-band information signal that was originally transmitted. The rake receiver comprises branches where the received multipath-propagated signal components are demodulated. According to the invention, in addition to the other parameters, the optimum number of the branches in the rake receiver can also be measured and stored in the subscriber database 250.

The network subsystem is arranged to utilize the parameters of the bidirectional radio connection stored in the network subsystem when a bidirectional radio connection is set up between the network subsystem and a subscriber terminal. In the base station shown in FIG. 2, this is carried out such that when the control unit 240 receives a call set-up request, it retrieves the parameters of the radio connection in question from the subscriber database 250. The control unit 240 then provides the parameters to a common beam former 224, 226 and commands it to generate by means of the parameters an oriented antenna beam that is transmitted via the antenna array 230 to the subscriber terminal. Correspondingly in the reception, a signal received via the antenna array 230 is used to form a beam by means of the receive antenna beam angle. During the connection set-up, the subscriber terminal is also informed of the air interface delay profile, so that the subscriber terminal knows the moment when it can transmit. The transmit power can also be indicated to the subscriber terminal. Alternatively, the subscriber terminal stores these parameters in its own memory, so that the network subsystem does not have to signal them during call set-up to the subscriber terminal.

In its simplest form the invention is carried out by means of software, in which case the control unit 240 is a digital signal processor or a general processor, and the steps of the method are operations carried out by means of the software. The invention can also be implemented for example with separate logic formed of HW components or with ASIC (application specific integrated circuit).

Figure 3:
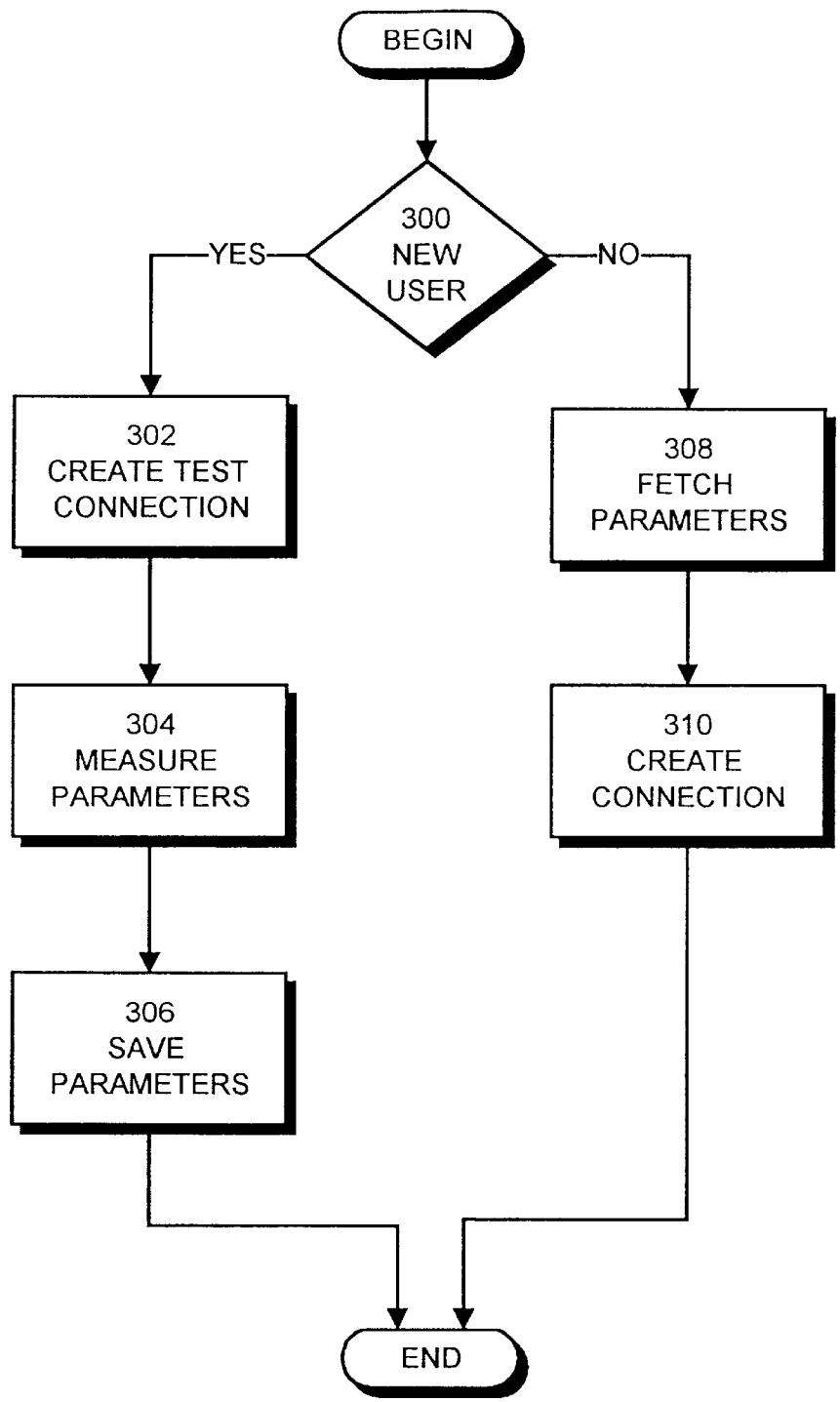
FIG. 3 is a flow chart illustrating the method according to the invention.

FIG. 3 illustrates the method steps in the form of a flow chart:

Step 300: It is first checked whether the user is new, i.e. whether the user sets up a radio connection to the network subsystem or vice versa for the first time, or whether the user has already had a radio connection, in which case the parameters are already stored.

Step 302: The user is new, wherefore a bidirectional test radio connection is set up.

Step 304: The parameters of the test radio connection are measured.

Step 306: The measured parameters are stored.

Step 308: The user is not new and therefore the stored user parameters are retrieved.

Step 310: A bidirectional radio connection is set up by means of the stored parameters.

Even though the invention is described above with reference to the example according to the accompanying drawings, it is clear that the invention is not restricted thereto but it can be modified in several ways within the scope of the inventive idea disclosed in the appended claims.

I claim:

1. A radio system comprising:
   a network subsystem for permitting communication between users;
   at least one subscriber terminal coupled to the network and having a fixed location; and
   a bi-directional radio connection between the subscriber terminal and the network subsystem, the bi-directional radio connection utilizing oriented antenna beams;
   the network subsystem comprising (i) at least one common measuring unit to measure parameters of a bi-directional test radio connection of a new user, (ii) means for storing the parameters of the test radio connection, and (iii) means for utilizing the parameters of the test radio connection stored in the network subsystem when the bi-directional radio connection is set up between the network subsystem and a subscriber terminal.

2. A system according to claim 1, wherein the parameters include a transmit beam angle.

3. A system according to claim 1, wherein the parameters include a receive beam angle.

4. A system according to claim 1, wherein the parameters include an air interface delay profile.

5. A system according to claim 1, wherein the parameters include an air interface impulse response.

6. A system according to claim 1, wherein the parameters include transmit power of the network subsystem.

7. A system according to claim 1, wherein the parameters include transmit power of the subscriber terminal at the fixed location.

8. A system according to claim 1, wherein CDMA and a rake receiver are used and the parameters include the number of rake branches of the receiver.

9. A method for setting up a bi-directional radio connection utilizing oriented antenna beams between a network subsystem and a fixed location subscriber terminal in a radio system, comprising:

setting up a bi-directional test radio connection if a user is new;

measuring the parameters of the new user's test radio connection;

storing the measured parameters;

retrieving the stored parameters if the user is not new; and setting up the bi-directional radio connection by means of the retrieved parameters.

10. A method according to claim 9, wherein the parameters include a transmit beam angle.

11. A method according to claim 9, wherein the parameters include a receive beam angle.

12. A method according to claim 9, wherein the parameters include an air interface delay profile.

13. A method according to claim 9, wherein the parameters include an air interface impulse response.

14. A method according to claim 9, wherein the parameters include transmit power of the network subsystem.

15. A method according to claim 9, wherein the parameters include transmit power of the subscriber terminal with a fixed location.

16. A method according to claim 9, wherein the radio system utilizes CDMA and a rake receiver, and the parameters include the number of rake branches of the receiver.

17. A radio system comprising:

a network subsystem for permitting communication between users;

at least one subscriber terminal coupled to the network and having a fixed location; and a bidirectional radio connection between the subscriber terminal and the network subsystem, the bi-directional radio connection utilizing oriented antenna beams;

the network subsystem comprising means for storing the parameters of the bi-directional radio connection, and means for forwarding at least one parameter of the radio connection to the subscriber terminal when the radio connection is set up.

\* \* \* \* \*

UNITED STATES PATENT AND TRADEMARK OFFICE
CERTIFICATE OF CORRECTION

PATENT NO. : 6,023,607
DATED : February 8, 2000
INVENTOR(S) : SIIRA

It is certified that error appears in the above-identified patent and that said Letters Patent is hereby corrected as shown below:

Item [73] Assignee Please change

"Nokia Telecommunication Oy, Espoo, Finland to

"Nokia Telecommunications Oy, Espoo, Finland

Signed and Sealed this

Twenty-seventh Day of February, 2001

*Attest:*

NICHOLAS P. GODICI

*Attesting Officer*    *Acting Director of the United States Patent and Trademark Office*